June 1, 1937. R. G. LE TOURNEAU 2,081,939
IMPLEMENT HOISTING FRAME FOR TRACTORS
Filed April 10, 1936
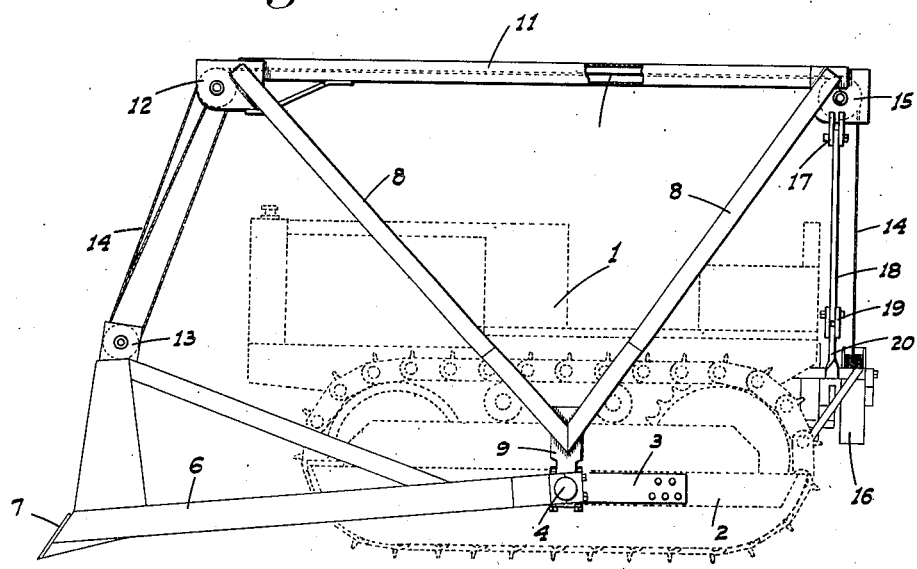
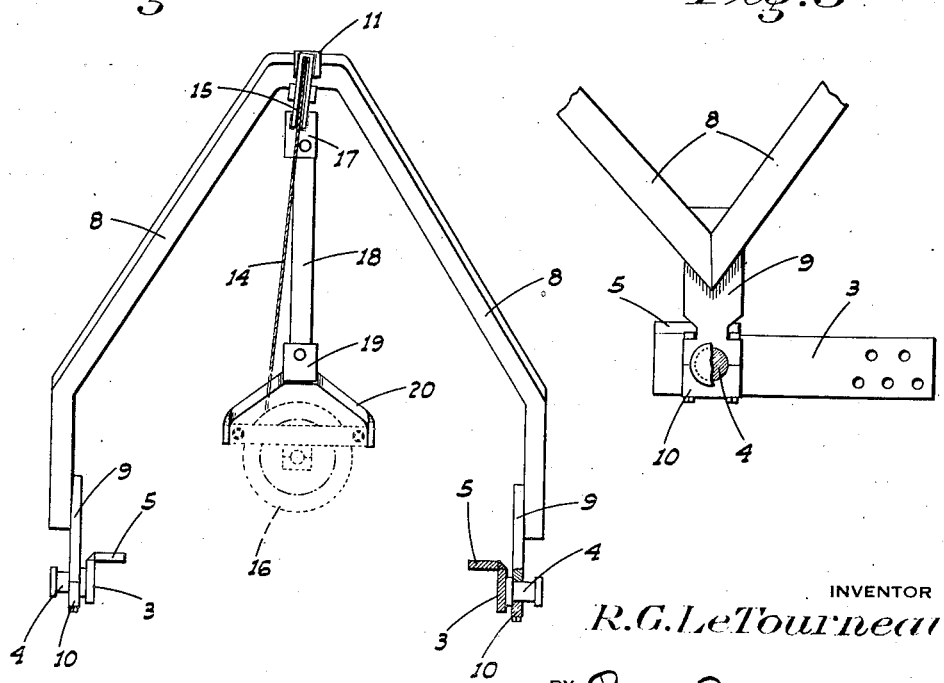
INVENTOR
R.G.LeTourneau
BY
ATTORNEY Patented June 1, 1937

2,081,939

UNITED STATES PATENT OFFICE 2,081,939

IMPLEMENT HOISTING FRAME FOR TRACTORS

Robert G. Le Tourneau, Stockton, Calif., assignor to R. G. Le Tourneau, Inc., Stockton, Calif., a corporation of California Application April 10, 1936, Serial No. 73,686

7 Claims. (Cl. 37—144)

This invention relates to tractor mounted implements, such as graders, bulldozers and the like, and particularly to a device for raising and lowering the implement from the tractor. A structure of this general character is shown for instance in my Patent No. 1,964,359 dated June 26, 1934, over which the structure of the present invention is an improvement.

In the previous arrangement, an upward pull on the control cable of the implement tended to tip the tractor forwardly, and the main object of my present invention is to so mount the cable-pulley supporting frame on the tractor that the downward pressure on the frame, due to the weight of the implement when lifted, is transmitted to the tractor at a point substantially midway of its length, thereby eliminating any tendency to tip the tractor.

Another object is to construct and mount this frame so that it may be easily applied to or removed from the tractor without dismantling the frame.

Also, the mounting of the frame on the tractor requires no attachments to the latter other than a pair of opposed trunnion brackets, which also serve as the means to mount the side bars of the implement in connection with the tractor.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side outline of a tractor, showing an implement connected thereto and my novel control frame mounted thereon.

Figure 2 is a rear end view, partly in section, of the frame and its supporting brackets, detached from the tractor.

Figure 3 is an enlarged side view of one of the brackets and the adjacent portion of the frame.

Referring now more particularly to the characters of reference on the drawing, the tractor 1 on which the implement and control frame are mounted is of the endless track type; each endless track truck including a longitudinal frame beam 2.

Rigidly secured on the sides of these truck beams intermediate their ends are bracket plates 3, from adjacent the front end of which trunnions 4 project outwardly.

The front end portions of the plates, above the trunnions, are provided with flanges 5 which overhang the corresponding top face of the beams 3. The holding bolts of the brackets are thus relieved of the down strain imparted thereto at the trunnions.

The trunnions serve as the pivotal supports of the side beams 6 of the bulldozer 7 or similar implement which extends across in front of the tractor. The trunnions also serve as the supports for the control frame, which will now be described.

This frame may be considered as being a combined V and A frame and comprises on each side of the tractor, a pair of beams 8 arranged in side of the tractor, a pair of beams 8 arranged in V relation to each other or forming a V shaped unit, with the apex of the V a short distance above the corresponding trunnion. The upper ends of the beams lie adjacent the vertical planes of the ends of the tractor.

The beams are of hollow rectangular form for lightness and strength, and a flat plate 9 is welded against their inner faces where they converge and abut each other; said plate depending from the beams to fit between the bracket plates 3 and the implement beams 6. The lower ends of the plates 8 of both V beam units are provided with removable caps 10, said caps and plates being formed with complementary openings to engage the trunnions, as clearly shown in Figure 3.

The beams 8 of the two opposed units are parallel to each other in planes lengthwise of the tractor for a sufficient distance from their lower ends to miss the endless tracks of the tractor. Above such tracks, the corresponding beams of the V units converge symmetrically toward each other transversely of the tractor in A form, as shown in Figure 2.

The upper converging ends of the beams 8 are a sufficient distance above the tractor to avoid interference with the operator seated on the tractor, and are welded to a hollow longitudinal beam 11, which completes the frame structure itself.

A sheave block 12 is secured on the front end of beam 11, while a similar sheave block 13 is secured on the top of the implement. A cable 14, dead ended at the block 12, extends about and between the sheaves of the blocks through the hollow beam 11 and then over a sheave 15 secured on the rear end of the beam 11. The control cable thus extends from end to end of the tractor out of the way of the operator and where it cannot possibly harm him if it should break.

From the sheave 15, the cable depends to the drum of a power control unit 16 mounted on the rear end of the tractor and preferably of the character shown in my Patent No. 1,912,645 dated June 6, 1933.

In order to prevent tilting of the control frame about the trunnions, spaced ears 17 depend from the sheave 15 just ahead of the cable, between which ears is secured the upper end of a tension bar 18. The lower end of the bar is secured between ears 19 which are rigid with a yoke 20 or similar element secured to the power unit in front of the cable drum thereof.

It will thus be seen that the downward pressure on the control frame, due to a pull on the cable while lifting the implement is substantially equalized at both ends of the frame, and is transmitted to the trucks of the tractor at points substantially centrally of the length of the tractor, obviating any tendency of the same to tip forwardly.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A hoist frame for tractors comprising a single beam to extend substantially the full length of a tractor above the same, sheaves on the beam at its ends, a hoist cable passing over the sheaves, the tractor having a cable drum to which the adjacent end of the cable extends, pairs of side beams rigid with and depending from the longitudinal beam adjacent its ends on opposite sides of the tractor, and means to detachably mount said side beams at their lower ends on the tractor at points intermediate the ends thereof.

2. A hoist frame for tractors comprising a single beam to extend substantially the full length of a tractor above the same, sheaves on the beam at its ends, a hoist cable passing over the sheaves, the tractor having a cable drum to which the adjacent end of the cable extends, pairs of side beams supporting and depending from the longitudinal beam adjacent its ends, the pair of beams on each side converging toward their lower end in a plane lengthwise of the tractor and diverging from the longitudinal beam in a plane transversely of the tractor to clear the sides thereof at the lower end of the beams, and means to supportingly mount the pairs of side beams at their lower end in common on the tractor at points substantially central of the length thereof.

3. A structure as in claim 2, with a tension bar connected to the longitudinal beam at one end thereof and depending therefrom, and means to mount the lower end of the bar in rigid connection with the tractor.

4. A hoist frame for tractors comprising a single beam to extend substantially the full length of a tractor above the same, sheaves on the beam at its ends, a hoist cable passing over the sheaves, the tractor having a cable drum to which the adjacent end of the cable extends, pairs of side beams supporting and depending from the longitudinal beam adjacent its ends, the pair of beams on each side converging toward their lower end in a plane lengthwise of the tractor and diverging from the beam in a plane transversely of the tractor to clear the sides thereof at the lower end of the beam elements rigid with the pairs of beams at their lower converged ends, and trunnions adapted to be mounted on and project outwardly from the tractor, engaging said elements.

5. A structure as in claim 4, with separate means between the frame and tractor to prevent turning of the frame about the trunnions.

6. A hoist frame for tractors comprising a beam to extend substantially the full length of a tractor above the same, sheaves on the beam at its ends, a hoist cable passing over the sheaves, the tractor having a cable drum to which the adjacent end of the cable extends, pairs of side beams supporting and depending from the longitudinal beam adjacent its ends, the pair of beams on each side converging toward their lower end in a plane lengthwise of the tractor and diverging from the beam in a plane transversely of the tractor to clear the sides thereof at the lower end of the beams, plates rigid with and depending from the pairs of beams at their lower converged ends, trunnions engaging the plates, and bracket plates from which the trunnions project adapted to be secured on the sides of the tractor.

7. An implement and hoisting unit for attachment to a tractor comprising with an implement, side beams thereon, a hoist frame including a top beam above the implement and side beams depending from and rigid with the top beam, a hoist cable extending between the implement and tractor over the top beam of the frame, trunnions forming a common support for the corresponding side beams of the implement and frame and on which the implement beams are turnable, means to prevent turning of the frame beams on the trunnions and means to mount the trunnions on the tractor.

ROBERT G. LE TOURNEAU.